United States Patent [19]

Hamel et al.

[11] Patent Number: 4,503,585

[45] Date of Patent: Mar. 12, 1985

[54] PNEUMATIC STUNNER

[75] Inventors: Jerome T. Hamel, Shawnee; Bernard G. Huff, Shawnee Mission, both of Kans.

[73] Assignee: Hantover, Inc., Kansas City, Mo.

[21] Appl. No.: 484,938

[22] Filed: Apr. 14, 1983

[51] Int. Cl.³ .............................................. A22B 3/02
[52] U.S. Cl. ...................................... 17/1 B; 42/1 M; 227/130
[58] Field of Search ............................ 17/1 B; 42/1 M; 227/130

[56] References Cited

U.S. PATENT DOCUMENTS

| 2,809,391 | 10/1957 | Brooks et al. | 17/1 B |
| 3,572,572 | 3/1971 | Readyhough | 227/130 X |
| 3,708,096 | 1/1973 | Burke | 227/130 |
| 3,715,069 | 2/1973 | O'Conner | 227/130 |
| 3,784,077 | 1/1974 | Burke et al. | 227/8 |

FOREIGN PATENT DOCUMENTS

| 168769 | 3/1906 | Fed. Rep. of Germany | 17/1 B |
| 2927606 | 1/1981 | Fed. Rep. of Germany | 17/1 B |
| 406235 | 2/1934 | United Kingdom | 17/1 B |

Primary Examiner—Willie G. Abercrombie
Attorney, Agent, or Firm—Schmidt, Johnson, Hovey & Williams

[57] ABSTRACT

An improved animal stunning device is provided which allows the user a quick, easy and cost effective method to kill animals in a slaughterhouse operation. The animal stunner preferably includes a pneumatically activated stunning gun having a trigger assembly provided with a manually operable safety block shiftably mounted on the trigger; movement of the safety block permits selective actuation of the gun or, alternately, prevents such actuation. The gun includes an elongated, reciprocally mounted stunning element having a bored, concave, stunning tip. An elongated, tubular, protective, support nose passageway is provided for slidably supporting and directing the stunning element during operation. Exhaust ports are advantageously provided in the support nose which communicate the interior of the stunner with the atmosphere for proper pneumatic venting; these ports can be selectively blocked to maintain the desired pneumatic compression within the stunner during operation.

5 Claims, 8 Drawing Figures

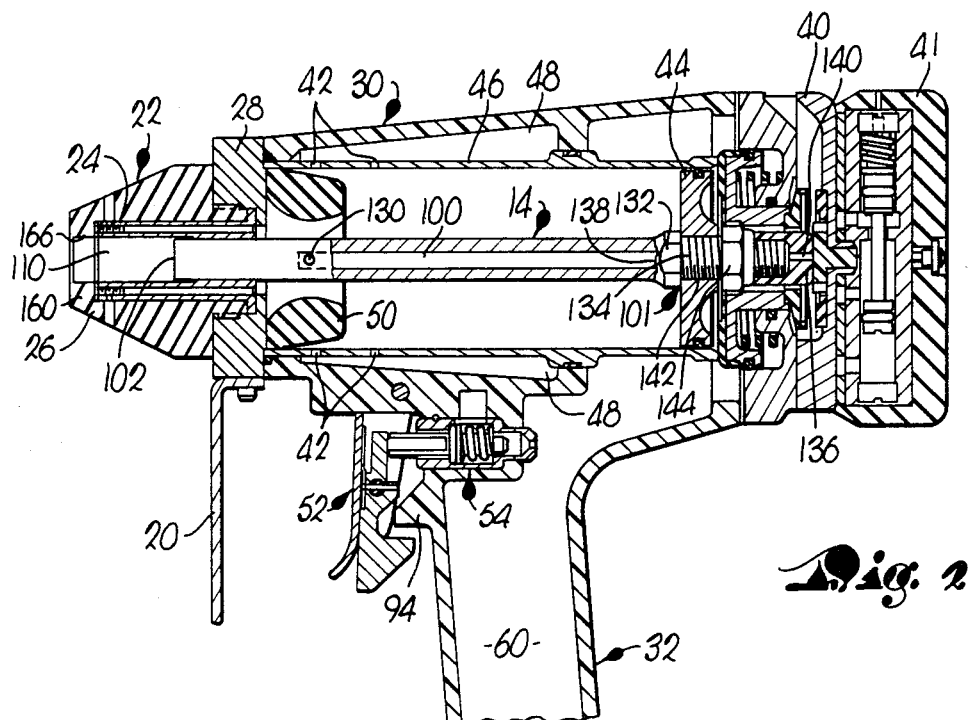
Fig. 2
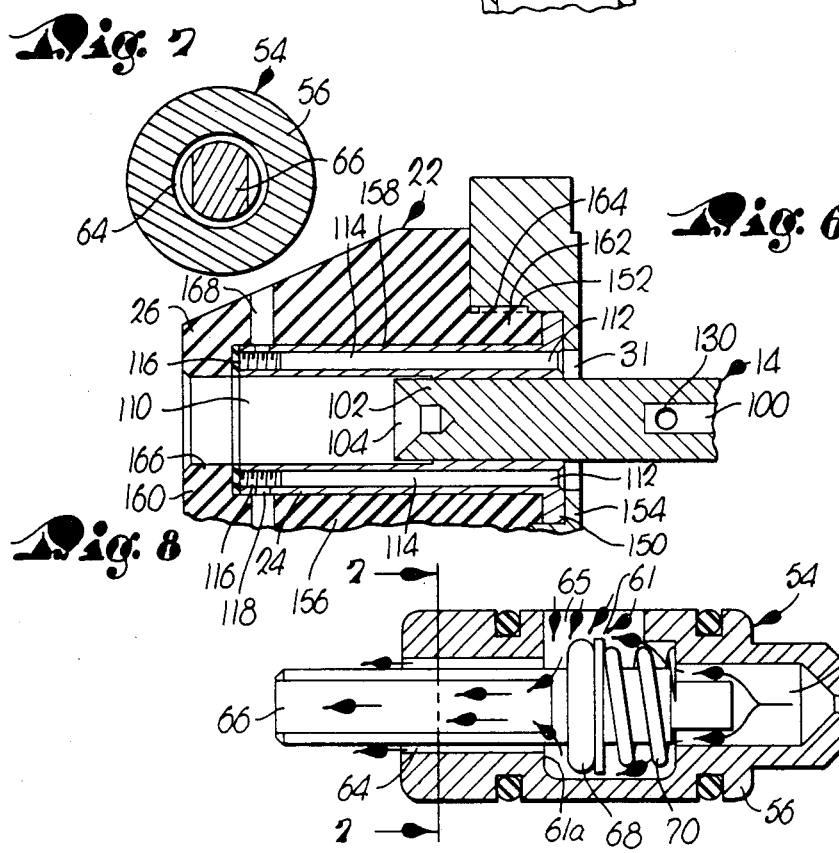
Fig. 7
Fig. 6
Fig. 8
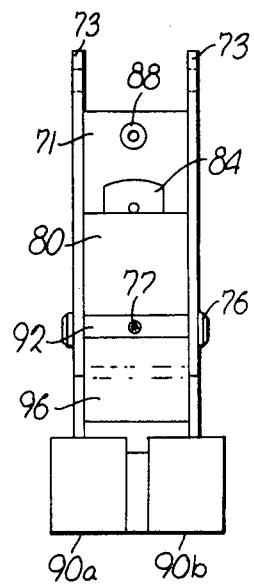
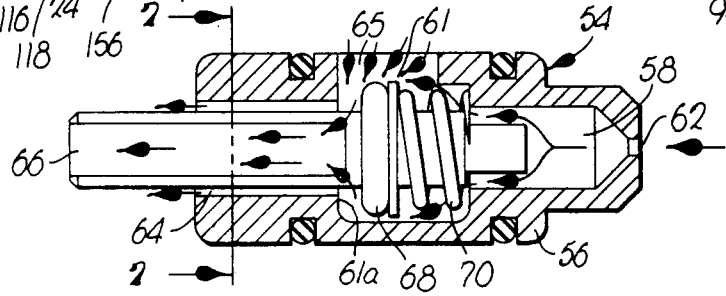
Fig. 5

PNEUMATIC STUNNER

BACKGROUND OF THE INVENTION

1. Field of the Invention

This invention relates to an animal stunning device for use in an animal slaughterhouse operation which has numerous advantages including safe, easy operation, quick, effective, stunning capability, and the ability to be easily maintained for efficient operation even after significant use and wear. More particularly, it is concerned with an animal stunner having a trigger assembly with a safety mechanism, a stunning element which reciprocates from within the stunner to a position outside the stunner, and a support nose passageway which not only provides direction and support for the stunning element during operation, but also is designed to provide proper venting of the interior of the stunner with the atmosphere.

2. Description of the Prior Art

In an animal slaughterhouse operation, especially of the assembly line type, it is important to be able to disable or stun an animal in a cost effective manner. Moreover, the stunning equipment must be completely safe in use to prevent accidents and harm to plant personnel. Past methods of disabling an animal include bludgeoning the head, cutting the throat and allowing the animal to bleed to death, and firing a non-reusable projectile into the brain of the animal. As can be appreciated, various mechanical devices have been employed to accomplish the various methods. In practice, however, these methods have been defective in that they are often cruel to the animal, expensive, and most importantly, unsafe to plant personnel. In contemporary slaughterhouse operations it is critical that the equipment used be safe to the operating personnel.

SUMMARY OF THE INVENTION

The problems outlined above are in large measure solved by the animal stunner in accordance with the present invention. That is, the animal stunner hereof may be safely operated in a cost effective manner. Additionally, it is specifically designed to withstand the rigors of animal slaughter operation and to be maintainable even after extensive use and wear.

The animal stunner in accordance with the present invention broadly includes a housing, a stunning element, a shiftable mounting within the housing to which the stunning element is rigidly connected, a trigger mechanism for activating the stunner which incorporates a safety block for preventing inadvertent actuation, and a support nose passageway connected to the housing which receives, guides and protects the stunning element.

In particularly preferred forms, the trigger mechanism is operatively coupled with the shiftable mounting and includes a selectively actuatable safety block which may be shifted between an operating position, enabling the trigger, and a safe position, preventing trigger operation. Additionally, the stunning element preferably has a butt end rigidly attached to the shiftable mounting and has a penetrating end, bored to present a concave indentation in the tip. In the preferred form, the stunning element has a hollow core which communicates through interconnected apertures in the butt end and shiftable mounting to a pneumatic pressure source. Proximal to the penetrating end, the hollow core communicates with the exterior of the element through radial apertures. Furthermore, a support nose passageway is rigidly connected to the housing for supporting and directing the stunning element during reciprocation thereof, and for providing pressure relief for air during the reciprocation of the shiftable mounting by way of exhaust ports connecting the interior of the housing with the atmosphere. Such ports may be selectively plugged for maintaining the proper internal compression, which may vary due to wear of internal drive components.

BRIEF DESCRIPTION OF THE DRAWINGS

FIG. 2 is an enlarged, fragmentary, vertical sectional view of the device illustrated in FIG. 1, which depicts the internal construction of the device;

FIG. 5 is an enlarged vertical sectional view of the pneumatically actuated trigger valve;

FIG. 6 is a rear elevational view of the trigger assembly;

FIG. 7 is a vertical section view taken along line 7—7 of FIG. 5; and

FIG. 8 is a vertical sectional view of the stunning element support passageway which illustrates the stunning tip of the stunning element, the passageway, the protective nose piece, and the exhaust ports which may be selectively blocked.

DESCRIPTION OF THE PREFERRED EMBODIMENT

Figure 1:
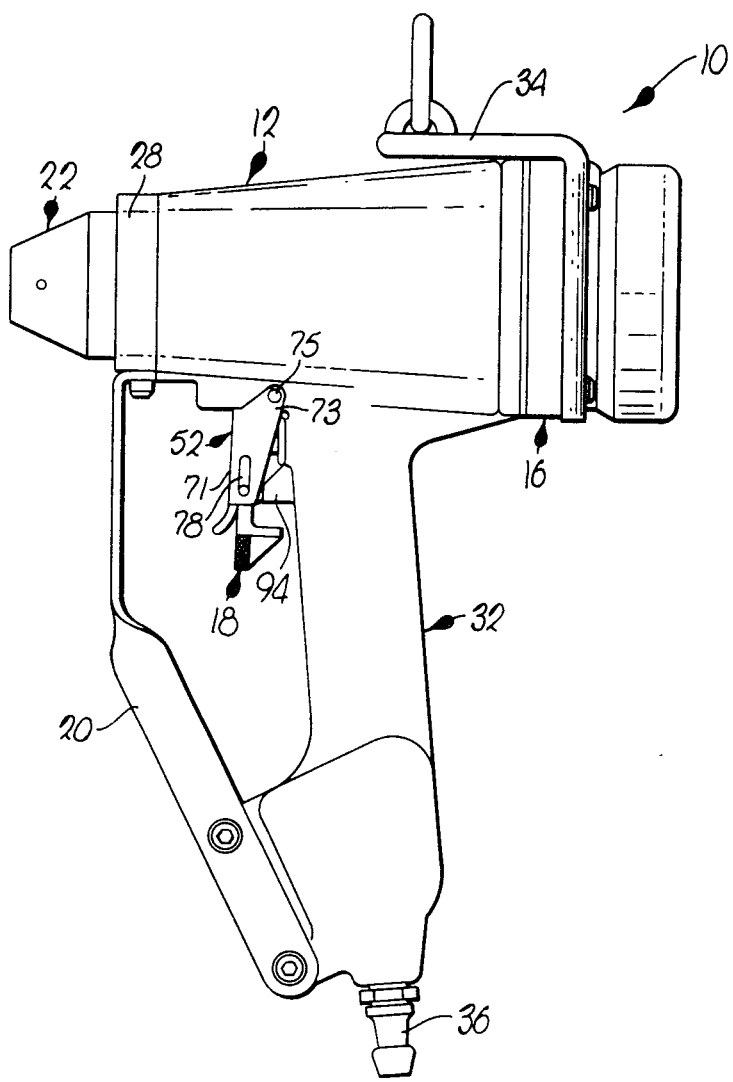
FIG. 1 is a side elevational view of the animal stunner in accordance with the invention.
Figure 3:
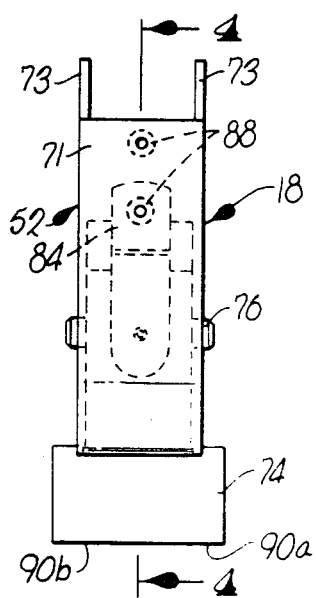
FIG. 3 is a front elevational view of the trigger assembly, with certain parts illustrated in phantom.

In particular aspects, the present invention is concerned with improved versions of known pneumatic fastener driving guns, with the improvements enabling operation in an animal slaughterhouse. Accordingly, all of the details of construction and operation of the known guns need not be fully described. The following patents illustrate known pneumatic fastener driving guns and the disclosures are herein incorporated by reference: U.S. Pat. Nos. 3,784,077, 3,715,069 and 3,708,096.

Referring now to the drawings, an animal stunner 10 in accordance with the invention broadly includes a housing 12, a stunning element 14, shiftable mounting means 16 for projecting one end of stunning element 14 from the housing 12 for stunning an animal, an actuating assembly 18 for initiating the operation of the stunner, and a support nose passageway assembly 22, connected to housing 12 and configured for slidably receiving the stunning element 14.

In more detail, housing 12 preferably includes hollow operating chamber 30 attached to, and communicating with, a hollow, depending handle 32 having an interior region 60. The chamber 30 presents a front, flattened end 28 and includes structure defining a central, circular opening 31, extending therethrough. End 28 also includes a threaded countersink 152 coaxial with opening 31 but of a greater diameter, thereby presenting a circular projecting tab 154 in end 28. A hanger 34 is rigidly connected to operating chamber 30 and contains a closed end loop presenting a convenient storage means.

As best seen in FIG. 1, handle 32 also includes a tubular fitting 36 adjacent the lower end thereof, which communicates the interior of handle 32 with a source of pressurized air. An elongated trigger guard 20 is rigidly connected to the lower end of handle 32 adjacent fitting 36, and also to operating chamber 30. The handle 32 additionally includes a blocking projection 94 located toward the end opposite fitting 36 and in facial opposition to trigger guard 20.

Stunning element 14 is preferably cylindrical in shape and presents a butt end 101, connecting to shiftable mounting means 16, and a stunning end 102. An elongated, hollow, interior core 100 is included in a portion of element 14. Proximal the end 102, the core 100 has structure defining a plurality of radially-extending apertures 130 communicating the core to the exterior of the element 14. As best seen in FIG. 8, stunning end 102 preferably includes penetrating structure 104 presenting a concave indentation of a generally conical configuration.

As seen in FIG. 2, the butt end 101 of element 14 includes a necked-out, hex-nut, face abutment 132 and an elongated, cylindrical threaded portion 134 extending from abutment 132 to the distal edge of butt end 101. A resilient, flexible, piston return bumper 136 is complementally tapped for threading securement over butt end 101. Structure is included defining a pair of interconnected apertures 138, 140 in the butt end 101 and bumper 136 respectively, communicating core 100 to the exterior of element 14.

Generally speaking, shiftable mounting means 16 includes pneumatic valves 40 and 41, a reciprocating piston 44 slidably received within elongated piston sleeve 46, piston return air plenum chambers 48 adjacent and surrounding piston sleeve 46, return apertures 42 communicating the interior of piston sleeve 46 and the chambers 48, and bumper pad 50 located within piston sleeve 46 adjacent the forward end thereof remote from pneumatic valves 40. In the preferred embodiment, the reciprocating piston 44 includes a central threaded bore 142 complementally configured for receiving threaded portion 134 of stunning element 14. The piston 44 and element 14 are preferably additionally secured by lock nut 144.

Actuating assembly 18 is attached to housing 12 and communicates with the handle region 60. Assembly 18 broadly includes trigger means 52 and actuating means 54 operatively coupled to pneumatic valves 40. As best seen in FIG. 5, actuating means 54 has tubular guide structure 56 defining an elongated, internal, air chamber 58, the latter communicating handle region 60 with the atmosphere. The chamber 58 has an enlarged region 61 partially defined by valve seat 61a, the purpose of which will be later explained. An inlet 62 is provided in the form of a restricted orifice located in the inboard end of structure 56, and communicates air chamber 58 with region 60. In turn, an opposed output 64 in the opposite end of structure 56 communicates air chamber 58 with the atmosphere. A central, transverse bore 65 is provided through the sidewall of structure 56, and communicates with internal chamber 58. As depicted in the drawings, an elongated, axially shiftable, flattened operating member 66 is slidably received within guide structure 56 and extends outwardly beyond outlet 64. A valve seal 68 is positioned about member 66 intermediate the ends thereof, along with a coil return spring 70 serving to bias the member to its forward position wherein the seal 68 engages seating surface 61a.

Figure 4:
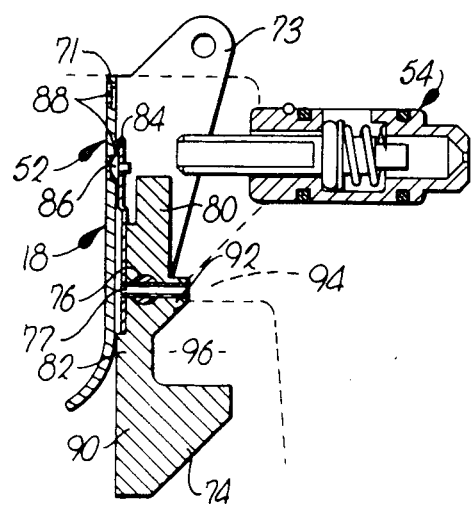
FIG. 4 is a vertical sectional view taken along line 3—3 of FIG. 3 which illustrates the safety block in its safety position for preventing actuation of the trigger assembly.

As best seen in FIGS. 1 and 4, trigger means 52 includes a pull initiator 72 comprising face plate 71 and rigidly attached hinge plates 73 connected to housing 12 as at 75. Safety block 74 is slidably mounted within pull initiator 72 by pin 76 slidably received within slots 78 respectively provided in each hinge plate 73. Safety block 74 basically presents an upper, member-engaging portion 80 and a lower, blocking portion 82. Blocking portion 82 is provided with safety block handle 90 at the lower extremity thereof, and recess 96 adjacent said handle 90. Handle 90 incorporates adjacent pull grips 90a and 90b. Member-engaging portion 80 includes engagement surface projection 92, along with a metallic innerface tab 84, the latter being rigidly connected by retainer pin 77 to safety block 74 adjacent pull plate 72. Locking rivet 86 is located at the upper end of innerface tab 84, while the inner face of pull plate 72 has a pair of vertically spaced complemental detents 88 of a size sufficient to receive locking rivet 86 when safety block 74 is correspondingly shifted.

Support nose passageway assembly 22 is connected to housing 12 at the forward end of operating chamber 30 opposite pneumatic valves 40 and 41, and broadly includes nose bearing 24 and nose protector 26. Nose bearing 24 has a central, elongated tubular passageway 110 complementally configured for slidably receiving stunning element 14. Passageway 110 is dimensioned for close conformity to element 14 such that during operation only a small amount of air escapes through passageway 110; in this regard, exhaust opening 112 is provided for venting the remaining portion of the air from the interior of piston sleeve 46 to the atmosphere. Preferably, nose bearing 24 has a plurality of elongated bores 114 spaced about and in alignment with central passageway 110 such that the bores 114 communicate with exhaust opening 112 (see FIG. 8). As shown in FIG. 8, the bores 114 may be selectively blocked for maintaining compression in the interior of sleeve 46 during operation, using for example, nylon set screws 116. Additionally, a circular lip 150 is provided adjacent bores 114 which adjoins housing 12 near opening 112. Radially-extending orifices 118 are included, respectively communicating with bores 114.

Nose protector 26 is preferably a metallic, generally cylindrical body 156 having an elongated, central tubular sleeve 158 extending therethrough, a conically-shaped end 160, and a protruding end 162. The protruding end 162 presents a cylindrical, externally-threaded projection 164 complementally dimensioned for screwing insertion in threaded countersink 152. The sleeve 158 is complementally dimensioned to slidingly receive nose bearing 24, but of a greater length such that body 156 presents a circular lip 166 in conical end 160 to engage bearing 24 adjacent the bores 114 while communicating passageway 110 with the atmosphere. Additionally conical end 160 presents a plurality of radially-extending discharge tubes 168, complementally aligned with orifices 118. Assembly 22 is thus formed by sliding bearing 24 into sleeve 158 of protector 126. The assembly 22 is then secured to front end 28 by axially rotating assembly 22 threadingly securing projection 164 in countersink 152 until lip 150 engages tab 154.

In use, the animal stunner 10 is connected to a pneumatic pressure source at fitting 36 which delivers pressurized air to handle interior 60 and pneumatic valves 40. When safety block 74 is shifted to its lower locking position by manually pulling block handle 90, and held in that position by the engagement of rivet 86 with lower detent 88, gun actuation is prevented by the engagement between surface projection 92 with locking projection 94. Additionally, the clearance between upper member 80 and operating member 66 prevent gun actuation (see FIG. 4). When safety block 74 is shifted to its upper position, rivet 86 is slidably received in upper detent 88, thereby holding safety block 74 in its upper position. In its upper, operating position safety block 74 is inwardly shiftable when pull initiator 72 is manually pulled, so that member-engaging portion 80 contacts operating member 66 and shifts the same. Further, when block 74 is in its operating position and plate 72 is manually depressed, recess 96 receives housing projection 94, thus permitting the depression of trigger means 52.

The shifting of operating member 66 provides clearance between valve seal 68 and valve seat 61a, compressing the normally forward biased coil return spring 70. This clearance allows a portion of the pressurized air in the handle region 60 to enter chamber 58 through inlet 62 and exit into the atmosphere via outlet 64. This initiation of actuating means 54 enables the operation of pneumatic valves 40 and 41 permitting pressurized air to pass from handle region 60 into piston sleeve 46 between piston 44 and pneumatic valve 40. This pressurized air reciprocates piston 44 from its retracted position, as shown in FIG. 2, in which stunning element 14 is contained within the stunner 10, to its extended position where piston 44 contacts bumper pad 50 and stunning element 14 is rapidly projected from the stunner 10. During this reciprocation, a portion of the pressurized air between valve 40 and piston 44 is forced through apertures 138, 140 into hollow core 100 and out apertures 130. A portion of the air between piston 44 and end 28 in sleeve 46 is compressed during operation, thereby forcing air through the apertures 42 and into plenum chambers 48. The combination of annular bumper pad 50 and plenum chambers 48, therefore, aid in cushioning piston 44 and returning the same to its retracted position. The remaining air in sleeve 46 between piston 44 and end 28 is predominantly expelled through exhaust opening 112 into bores 114 and into the atmosphere through tubes 168. Because internal compression within housing 12 is critical, the bores 114 may be selectively blocked by screws 116 to compensate for compression loss due to ordinary wear and increased clearances between stunning element 14 and passageway 110.

In slaughterhouse operation, support nose assembly 22 is placed to contact the animal's head and upon actuation of assembly 18, the stunning element 14 projects through the skull of the animal and into the brain, and air is expelled into the skull through apertures 130, the combination thereby immediately killing the animal. Nose protector 26 protects assembly 22 from the rigors associated with slaughterhouse operations and allows for easy maintenance. The hollow bore 100 in stunning element 14 in addition to providing an air passageway, allows for a lighter construction, and therefore faster reciprocation of stunning element 14. The design of stunning end 102 is particularly adapted for quick, easy penetration of the skull of an animal. Thus, stunner 10 is specifically designed to operate in a safe, efficient and cost effective manner as described above.

We claim:
1. A stunner, comprising;
    a housing having an engagement surface;
    a stunning element;
    means shiftably mounting said stunning element within said housing, including means for projecting one end of said element from said housing for stunning an animal;
    selectively shiftable trigger means;
    means operatively coupling said trigger means and element projecting means for operating the latter upon shifting of said trigger means, said coupling means including an operating member normally spaced from said trigger means;
    selectively actuatable safety means for preventing inadvertent actuation of said coupling means by preventing shifting of said trigger means, said safety means including
    a safety block having a member-engaging portion and a locking portion;
    means mounting said block generally between said trigger means and operating member for simultaneous shifting of said block and trigger, and for selective movement of the block between an operating position wherein, upon said shifting of said trigger means, said block portion shifts with said trigger means and engages said operating member to operate said coupling means, and a safety position wherein said locking portion of the block is adjacent said engagement surface of said housing, such that upon said shifting of said trigger means said locking portion engages said engagement surface to prevent operation of said coupling means.

2. The stunner as set forth in claim 1, said mounting means including structure for reciprocal, sliding movement of said block between said positions.

3. The stunner as set forth in claim 1, wherein said engagement surface comprises an outer surface of a projection affixed to said housing, said locking portion comprising a projection extending from said block, said housing projection and said block projection being in generally aligned, opposed relationship when said block is in said locking position thereof for preventing trigger actuation.

4. The stunner as set forth in claim 1, wherein said member-engaging portion includes an elongated tongue of a length to engage said operating member when said safety block is in the operating position and to clear said operating member when said safety block is in the safety position.

5. The stunner as set forth in claim 3, wherein said block portion includes structure defining a recess for receiving said housing projection when said block portion is in its operating position, thereby permitting said engagement between said member-engagement portion and said operating member upon actuation of said trigger means.

* * * * *